(12) United States Patent
Srinivasan et al.

(10) Patent No.: US 10,332,534 B2
(45) Date of Patent: Jun. 25, 2019

(54) ENCODING AN AUDIO STREAM

(71) Applicant: Microsoft Technology Licensing, LLC, Redmond, WA (US)

(72) Inventors: Sriram Srinivasan, Sammamish, WA (US); Ming-Chieh Lee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 99 days.

(21) Appl. No.: 14/990,658

(22) Filed: Jan. 7, 2016

(65) Prior Publication Data
US 2017/0200454 A1  Jul. 13, 2017

(51) Int. Cl.
*G10L 19/00* (2013.01)
*G10L 21/00* (2013.01)
*G10L 21/04* (2013.01)
*G10L 19/16* (2013.01)
*H04L 29/06* (2006.01)
*G10L 19/002* (2013.01)
*G10L 19/22* (2013.01)
*G10L 19/24* (2013.01)
*H04L 12/26* (2006.01)
*G06F 9/50* (2006.01)

(52) U.S. Cl.
CPC .......... *G10L 19/167* (2013.01); *G06F 9/5038* (2013.01); *G10L 19/002* (2013.01); *G10L 19/22* (2013.01); *G10L 19/24* (2013.01); *H04L 43/0888* (2013.01); *H04L 65/4069* (2013.01); *H04L 65/602* (2013.01); *H04L 65/607* (2013.01); *H04L 65/80* (2013.01); *H04L 43/16* (2013.01)

(58) Field of Classification Search
USPC .................................................. 704/500–504
See application file for complete search history.

(56) References Cited

U.S. PATENT DOCUMENTS 7,023,839 B1 * 4/2006 Shaffer ................. H04L 1/0014
370/356
7,116,682 B1 * 10/2006 Waclawsky ........... H04J 3/1682
370/468

(Continued)

OTHER PUBLICATIONS

"International Search Report and Written Opinion", Application No. PCT/US2016/068609, dated Mar. 30, 2017, 17 pages.

(Continued)

*Primary Examiner* — Olujimi A Adesanya
(74) *Attorney, Agent, or Firm* — Klarquist Sparkman, LLP

(57) ABSTRACT

An audio stream is encoded for transmission to a receiving device via a communications channel. The to-be transmitted audio stream is received at an audio encoder executed on a processor. The processor has an amount of available processing resources. An available bandwidth of the communications channel is determined. Based on the determined bandwidth, a portion of the available processing resources is allocated to the audio encoder. The allocated portion is greater if the determined bandwidth is below a bandwidth threshold. The audio encoder encodes the audio stream using the allocated portion of processing resources, and transmits the encoded audio stream to the receiving device via the communications channel.

17 Claims, 4 Drawing Sheets

(56) References Cited

U.S. PATENT DOCUMENTS

| | | | |
|---|---|---|---|
| 7,307,980 B1* | 12/2007 | Shah | H04L 12/66 370/352 |
| 7,310,675 B2* | 12/2007 | Salesky | G06F 3/1415 709/227 |
| 7,873,074 B1* | 1/2011 | Boland | H04L 12/14 370/468 |
| 8,068,436 B2* | 11/2011 | Rui | H04L 43/0882 370/252 |
| 8,160,130 B2 | 4/2012 | Ratakonda et al. | |
| 8,270,473 B2 | 9/2012 | Chen et al. | |
| 8,396,117 B2 | 3/2013 | Rintaluoma | |
| 8,433,050 B1* | 4/2013 | Baten | H04L 65/80 375/219 |
| 8,689,267 B2 | 4/2014 | Hunt | |
| 2005/0024487 A1 | 2/2005 | Chen | |
| 2005/0052996 A1* | 3/2005 | Houck | H04L 29/06027 370/230 |
| 2006/0245377 A1* | 11/2006 | Jeong | H04Q 3/0045 370/260 |
| 2006/0245379 A1* | 11/2006 | Abuan | H04L 12/1827 370/261 |
| 2007/0140116 A1* | 6/2007 | Vega-Garcia | H04L 29/06027 370/230 |
| 2007/0211141 A1* | 9/2007 | Christiansen | H04L 29/06027 348/14.08 |
| 2009/0122868 A1 | 5/2009 | Chen et al. | |
| 2009/0307368 A1 | 12/2009 | Sriram et al. | |
| 2010/0046546 A1 | 2/2010 | Ram et al. | |
| 2010/0189183 A1 | 7/2010 | Gu et al. | |
| 2010/0198980 A1* | 8/2010 | Astrom | H04L 1/0014 709/231 |
| 2010/0299433 A1* | 11/2010 | De Boer | H04L 47/14 709/224 |
| 2011/0069625 A1* | 3/2011 | Michaelis | H04L 47/10 370/252 |
| 2012/0195364 A1 | 8/2012 | Yi et al. | |
| 2012/0300658 A1* | 11/2012 | Sloyer | H04L 12/1827 370/252 |
| 2013/0034151 A1 | 2/2013 | Zhou et al. | |
| 2013/0179589 A1 | 7/2013 | McCarthy et al. | |
| 2014/0153640 A1 | 6/2014 | Zhao et al. | |
| 2014/0375756 A1* | 12/2014 | Yang | H04N 7/152 348/14.09 |
| 2015/0046927 A1 | 2/2015 | Rodbro et al. | |
| 2015/0120933 A1* | 4/2015 | Yates | H04W 72/1236 709/226 |
| 2015/0201041 A1* | 7/2015 | Wang | H04M 7/0072 709/203 |
| 2015/0289279 A1* | 10/2015 | Xu | H04W 72/0486 370/329 |
| 2016/0165060 A1* | 6/2016 | Li | H04M 7/0072 370/259 |
| 2017/0063702 A1* | 3/2017 | Mani | H04N 21/2335 |
| 2017/0195672 A1* | 7/2017 | He | H04N 19/124 |
| 2017/0324934 A1* | 11/2017 | Barkley | H04N 7/147 |

OTHER PUBLICATIONS

Kim,"TCP-Friendly Internet Video Streaming Employing Variable Frame-Rate Encoding and Interpolation", IEEE Transactions on Circuits and Systems for Video Technology, vol. 10, No. 7, Oct. 2000, 14 pages.

"Cisco WebEx Network Bandwidth", In White Paper of Cisco, Jun. 2013, 24 pages.

"OpusFAQ", Available at: https://wiki.xiph.org/OpusFAQ, Dec. 15, 2014, 12 pages.

Bouthillier,"Product Review: RealProducer 10 Competes on Features, Codecs", Available at: http://www.streamingmedia.com/Articles/ReadArticle.aspx?ArticleID=64611&PageNum=2, Apr. 14, 2004, 2 pages.

Ivanov,"Real-Time H.264 Video Encoding in Software with Fast Mode Decision and Dynamic Complexity Control", In Journal of ACM Transactions on Multimedia Computing, Communications and Applications, vol. 6, Issue 1, Feb. 2010, 28 pages.

Luong,"Adaptive Mode Decision with Residual Motion Compensation for Distributed Video Coding", n Journal of APSIPA Transactions on Signal and Information Processing, vol. 4, Jan. 12, 2015, 11 pages.

International Preliminary Report on Patentability, International Application No. PCT/US2016/068609, dated Jul. 19, 2018, 11 pages.

* cited by examiner

ENCODING AN AUDIO STREAM

BACKGROUND

An audio stream may be transmitted from a transmitting device, such as a user device or a media server, to a receiving device, such as another user device, via a communications channel. The communications channel may for example be a channel over a communications network, for example a packet based communication network, e.g. the Internet. The transmission may based on VoIP (Voice over IP) technologies, for example in a call conducted over the network. That is, the audio stream may be transmitted as part of a call between two or more users or other some other real-time media communication event conducted via the network. To enable the communication event to take place, a user of the receiving device may execute an instance of a communications client on the receiving device. The communications client sets up the necessary VoIP connections to allow communications with the transmitting device during the communication event. The transmitting device may also be a user device, on which another instance of the communications client is executed. Alternatively the transmitting device may be a media server; for example, in a group call (conference call) between three or more users, each user may transmit their audio stream to a media relay server, and the server may selectively mix the received audio streams accordingly for transmission to the other users participating in the conference call.

In the context of the present disclosure, an audio stream means audio data that is streamed to a receiving device, whereby the audio data can be played out at the receiving device as it is received thereat, even while transmission of subsequent audio data continues to occur. This is in contrast to, say, audio data that is downloaded to a receiving device, which may be transmitted at a transmission rate less than its bitrate such that a user of the receiving device is required to wait for all (or at least a large portion) of the audio to be downloaded before they can instigate its playout free from buffering artefacts. Where audio data is streamed, there may in practice be some buffering of the received audio data at the receiving device. For example, if the audio data is encoded on a per-frame basis, the received audio data may be buffered to allow whole frames to be received before they are decoded and played out. Alternatively or in addition, some buffering may be used to provide robustness to variations in the arrival times of different pieces of audio data e.g. different audio frames, which is sometimes referred to as jitter.

An audio stream may be encoded prior to transmission by an audio encoder. The audio encoder may be implemented in software, i.e. as code executed on a processor. The processor may be formed of a CPU or multiple CPUs. A processor has an amount of available processing resources, which refers to a number of clock cycles of the processor that are available per unit of time (e.g. per second), and may for example be expressed in e.g. Hz, MHz or GHz etc. An audio encoder may operate to reduce the bitrate of an unencoded audio stream, by applying a compression algorithm to it. The compression algorithm may comprise lossless compression such as entropy encoding, whereby no information is lost from the audio stream due to the encoding; lossy compression whereby information is selectively discarded from the audio stream; or a combination of lossy and lossless compression. Discarding information from the audio stream allows its bitrate to be reduced but may come at a cost of reducing the perceptual quality of the encoded audio stream, i.e. the audio quality as perceived by a user consuming the encoded audio stream. Note that the terms "encoding" and "compression" are used interchangeably herein in relation to audio steams.

Different compression algorithms may be able to achieve equivalent bitrate reductions, but with different costs in terms of the reduction in perceptual quality. For example, more sophisticated compression algorithms may be able to select more carefully how information is discarded from the audio stream, and accordingly may be able to achieve a desired reduction in the bitrate of the audio stream whilst minimizing the reduction in the perceptual quality, as compared with their less sophisticated counterparts. On the other hand, more sophisticated compression algorithms may have a greater algorithmic complexity than their less sophisticated counterparts, such that they require a greater portion of the available processing resources than their less sophisticated counterparts. Algorithmic complexity is a measure of the number of processor clock cycles that are needed for the algorithm to process a given number of input bits, and can be expressed using so-called "big-O" notation, whereby in this context O(N) denotes an approximate number of clock cycles needed by the encoder to encode N bits of audio. Algorithmic complexity is referred to herein simply as complexity for conciseness. Certain audio encoders offer multiple audio encoding modes of different complexities, whereby higher complexity modes consume more processing resources than lower complexity modes. Currently available audio codecs that have this functionality include for example the Silk and Opus codecs.

SUMMARY

It is known in the art that by allocating more processing resources to an audio encoder executed on a processor, for example by selecting a higher complexity encoding mode of the audio encoder where available or by some other resource allocation means, it may be possible to increase the perceptual quality of an encoded audio stream generated by the encoder to an extent, as the increased allocation allows the encoder to apply more sophisticated compression. However, the present disclosure recognizes that, whilst a significant increase in the perceptual quality of the encoded audio stream can be achieved by increasing the amount of processing resources allocated to the audio encoder when the encoder is constrained to operate at a relatively low output bitrate (the output bitrate being the rate at which bits of the encoded audio stream are generated and outputted by the encoder), by contrast when the encoder is free to operate at a relatively high output bitrate, an equivalent increase in the amount of allocated processing resources may result in at best a marginal improvement in the perceptual audio quality. To put it another way, the present disclosure recognizes that the amount of processing resources allocated for use by the encoder can be reduced at higher output bitrates with minimal impact on perceptual audio quality.

The present subject matter exploits this in the context of encoding an audio stream for transmission to a receiving device via a communications channel, to provide a balance between, on the one hand, minimizing the amount of processing resources used to encode the audio stream and, on the other hand, maximizing the perceptual quality of the resulting encoded audio stream. The to-be transmitted audio stream is received at an audio encoder executed on a processor. The processor has an amount of available processing resources. An available bandwidth of the communications channel is determined. Based on the determined bandwidth, a portion of the available processing resources is allocated to the audio encoder. The allocated portion is greater if the determined bandwidth is below a bandwidth threshold than if it is above the bandwidth threshold. The audio encoder encodes the audio stream using the allocated portion of processing resources, and transmits the encoded audio stream to the receiving device via the communications channel.

The available bandwidth constitutes a maximum rate at which encoded audio data of the encoded audio stream can be transmitted via the communications channel, and hence imposes an upper limit on the output bitrate of the audio encoder i.e. on the amount of encoded audio data of the encoded audio stream that can be outputted by the audio encoder per unit of time and streamed via the communications channel. The upper limit decreases as the bandwidth decreases. Hence at higher bandwidths, the audio encoder is free to operate at a higher output bitrate and, as recognized by the present disclosure, is thus able to minimize perceptual audio distortion using fewer processing resources. However, at relatively low channel bandwidths the encoder is restricted to operating at a lower output bitrate, and thus needs more processing resources to be able to maintain an acceptable level of perceptual audio quality. In other words, the encoder is able to achieve an acceptable level of perceptual audio quality with fewer processing resources at higher bandwidths because a higher output bitrate can be used for the encoding in that event.

Note, this Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, whilst certain technical effects of the present subject matter are set out in this Summary, the subject matter is not limited in this respect and other technical effects may be achieved in various embodiments, such as but not limited to those described in the Detailed Description.

BRIEF DESCRIPTION OF FIGURES

For a better understanding of the present subject matter and to show how embodiments of the same may be carried into effect, reference is made by way of example only to the following figures wherein.

DETAILED DESCRIPTION OF EMBODIMENTS

Figure 1:
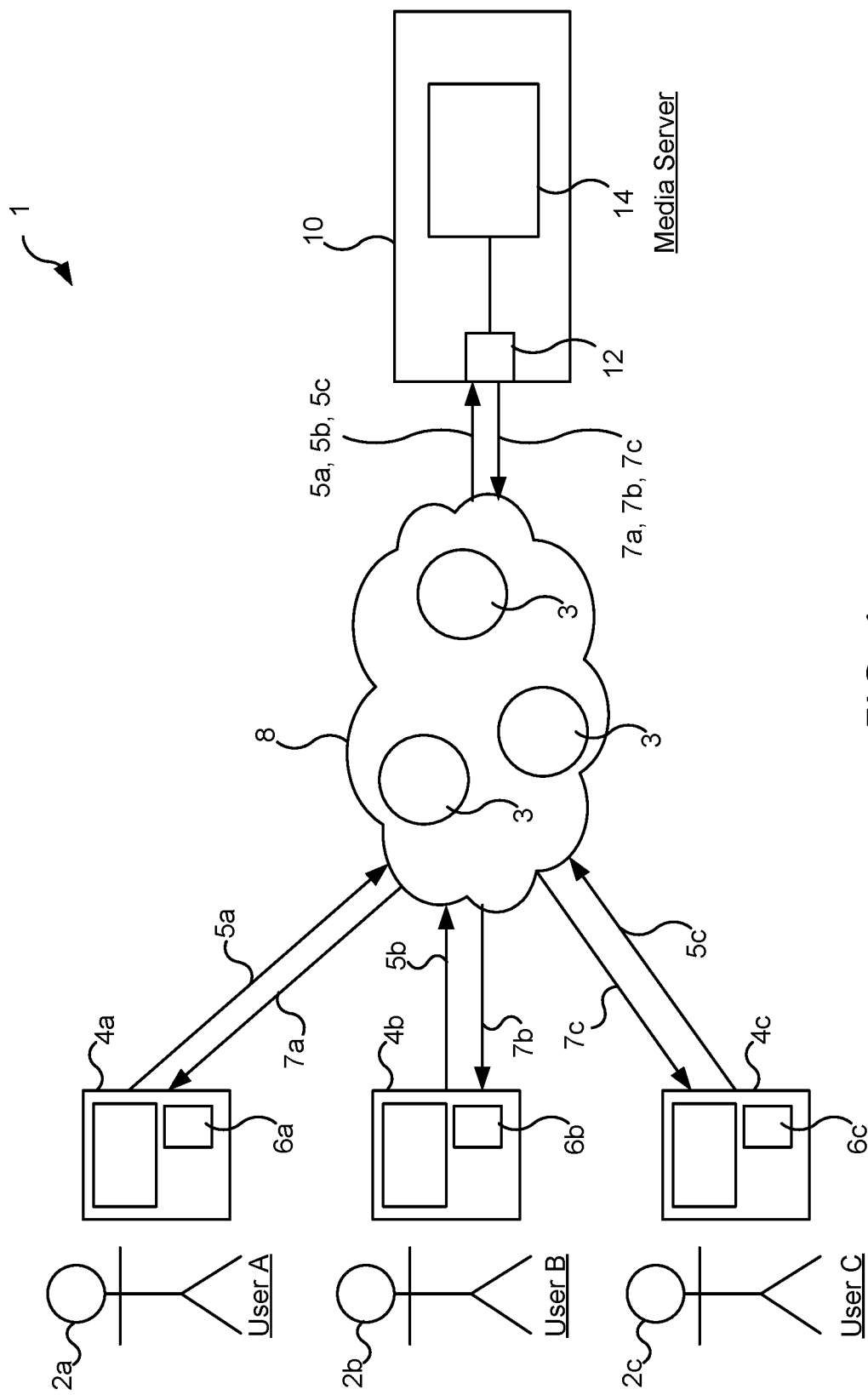
FIG. 1 shows a schematic block diagram of a communications system.

Group audio and video calls may be hosted on a server. Audio from multiple participants is mixed together at the server, encoded, packetized and transmitted to the participants. Audio encoding with modern codecs such as Silk and Opus is CPU-intensive as they aim to achieve high perceptual audio quality under low bitrates. The audio encoder complexity directly impacts the number of conferences that can be hosted on the server. Hereinbelow is described a method of managing codec complexity dynamically to improve server scale with minimal impact on quality. The method provides an optimal trade-off between server scale and audio quality.

Modern codecs such as Silk and Opus typically support multiple complexity modes, with the highest complexity mode providing the best quality but requiring the most processing resources which adversely affects server scalability. For example, Silk and Opus offer a low and a high complexity mode and one or more modes in between. The low complexity (LC) mode is typically an order of magnitude less computationally expensive than the high complexity (HC) mode. An issue is that when the available bitrate is low, the LC mode results in poor perceptual audio quality as measured by the mean opinion score (MOS) compared to the HC mode. Additionally, when processing an audio signal through two encoders with a decoder in between (known as tandem coding), the LC mode results in a significantly lower MOS than the HC mode. Tandem coding occurs for group audio calls hosted on a server where the encoded bit stream from individual participants is locally encoded at a client, and then at the server decoded, mixed, and re-encoded before being transmitted to the other clients.

One solution that favors audio quality would be to always run the encoder in high complexity mode. This however increases operational costs by an order of magnitude as fewer calls can be hosted by each server box.

A second alternative that favors server scale would be to always run the encoder in low complexity mode. However, this would result in poor audio quality under low bitrate conditions A third alternative would be to ensure that audio is always allocated sufficient bits for encoding since the difference between LC and HC quality is marginal under high bit rate conditions. This suffers from two drawbacks. First, not all clients may have sufficient bandwidth available, e.g., mobile and WiFi clients. Secondly, any bits that can be freed-up from audio without sacrificing audio quality can be assigned to video to improve perceived video quality.

By contrast, the embodiments of the present subject matter provide a balance between, on the one hand, maximizing the perceptual quality across all calls hosted on the server—including those for which one or more participants have limited bandwidth—and, on the other hand, minimizing the amount of processing resources consumed by audio encoding. The subject matter can be implemented at a server, such as a media relay server hosting calls, or at a client. For a server-side implementation, minimizing processing resource usage frees-up processing resources to host additional calls. For a client-side implementation, freeing up resources from audio allows, for example, higher-quality video encoding e.g. of video data of a video call, as the freed-up resources can be re-allocated to the video encoder. This also applied to server-side implementations in some cases: whilst some servers do not perform encoding but just forward video packets, other servers may perform some video encoding for example where transcoding is necessary—e.g., if the video encoding format used by the caller is not supported by the callee.

Embodiments of the present subject matter are described below by way of example. First a useful context in which they can be applied will be described.

FIG. 1 shows a block diagram of a communication system 1. The communication system 1 comprises a communications network 8, to which is connected first, second and third user devices 4a, 4b, 4c operated by first, second a third users 2a, 2b, 2c respectively; and a media relay server 10.

The network 8 is a packet based internetwork (internet) in this example, such as the Internet, which comprises a plurality of routers 3 which route data between individual networks of the internet 8. However, the network 8 can be another type of network such as a cellular network or PSTN. Where the user devices 4a, 4b, 4c are mobile devices, they may for example connect to the Internet via cellular network (s), for example.

Each of the user devices 4a, 4b, 4c comprises a respective processor 6a, 6b, 6c (comprising a CPU or CPUs), on which a respective instance of a communication client is executed. The communication client comprises software for effecting communication events within the communication system 1 via the network 8, such a conference call conducted between the first, second and third users 2a, 2b, 2c via the media relay server 10. The user devices 4a, 4b, 4c may for example be laptop or desktop computers, phones (smartphones), tablet devices etc.

The communication system 1 may be based on VoIP systems. These systems can be beneficial to the user as they are often of significantly lower cost than conventional fixed line or mobile cellular networks, particularly for long-distance communication. The client software sets up the VoIP connections as well as providing other functions such as registration and user authentication e.g. based on login credentials such as a username and associated password.

During a conference call between the users 2a, 2b, 2c, audio data is captured via a microphone of each of the user devices device 4a, 4b, 4c, and encoded locally by the client instance running on that device to generate a locally-encoded audio stream—denoted 5a, 5b and 5c respectively—that is packetized and transmitted over the network 8 to the media relay server 10. For example, each packet of the stream may contain one whole locally-encoded audio frame.

The media relay server 10 comprises a network interface 12 via which it is connected to the network 8, and at least one processor 14 connected to the network interface 12. The processor 14 may comprise a CPU or multiple CPUs, for example the processor 14 may be a single-core processor comparing a single CPU or a multicore processor comprising multiple interconnected CPUs. In general, the present disclosure is not limited to any specific form of processor, and in general a processor means any apparatus capable of executing software modules, such as audio encoders, and which has a limited amount of processing resources that must somehow be shared amongst those software modules when executed simultaneously.

The processor 14 processes the locally-encoded audio streams 5a, 5b, 5a received from the user devices 6a, 6b, 6c to generate, for each of the user devices 4a, 4b, 4c, a single respective mixed audio stream 7a, 7b, 7c (i.e. one mixed stream per user device participating in the conference call) that is transmitted from the media server 10 to that user device via the network interface 12 and over the network 8. This is described in detail below, but for now suffice it to say that, in generating the mixed audio streams 7a, 7b, 7c, software executed on the processor 14 must decode the received streams 5a, 5b, 5c, mix them accordingly to generated unencoded mixed audio, and then apply its own audio encoding to the unencoded mixed audio to generate the mixed streams 7a, 7b, 7c. In this example, the mixed audio stream (e.g. 5a) for each user (e.g. 4a) is generated by mixing together the audio streams of the other users (e.g. 5b, 5c), such that the user (e.g. 4a) can hear all of the other user speaking but does not have his own speech audio fed back to him. Hence, each of the mixed audio streams is different and bespoke to its intended user. In this manner, the media relay server 10 hosts the group conference call between the users 2a, 2b, 2c.

The encoding of the mixed audio streams at the media relay server 10 in particular requires significant processing resources. As will be apparent, the portion of the available processing resources that is required increases as the number of users participating in the call increases because each new user represents an additional, bespoke mixed stream that must be encoded. Moreover, although not shown explicitly in FIG. 1, the media relay server 10 can host multiple conference calls in this manner simultaneously, with each call requiring its own allocation of the available processing resources. Even if a bespoke audio stream is not generated for every user on a given call (e.g. in the case that one mixed audio stream is generated for all users by mixing all of their audio streams together), more processing resources are still needed as new calls are established. As such, the media relay server 10 can only host a certain number of calls and/or participating users given the finite processing resources that are available.

Only three users 4a, 4b, 4c of the communication system 1 are shown in FIG. 1, but as will be readily appreciated there may be many more users of the communication system 1, each of whom operates their own device(s) and client(s) to enable them to communicate with other users via the communication network 8. Whilst in the present example a conference call is conducted between three users 4a, 4b, 4c, more than three users may participate in a conference call.

Figure 2:
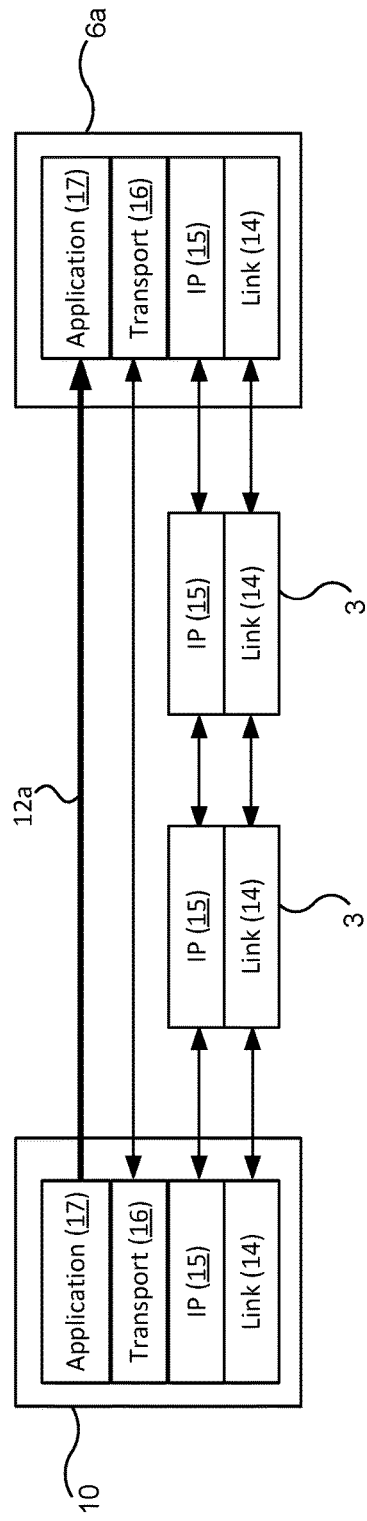
FIG. 2 shows a schematic block diagram illustrating a layered architecture of a communications network.

FIG. 2 shows how a channel 12 may be established over the network 8 between the media relay server 10 and a user device, which is the first user device 6a in this example. The network 8 has a plurality of network layers, namely a link layer 14 (lowest layer), a network layer 15 above the link layer 14, a transport layer 16 above the network layer 15, and an application layer 17 above the transport layer 16. The network layers may for example be in accordance with the TCP/IP suite. The application layer 17 provides process-to-process communication between processes running on different hosts i.e. computer devices connected to the network 8 such as the media relay server 10 and the user device 6a. The transport layer 16 provides end-to-end communication between different hosts, including providing end-to-end connections(s) between hosts, such as the media relay server 10 and the user device 6a, for use by the processes running on them. The internet layer 15 provides routing i.e. communication between different individual networks of the internet 8, via the routers 3. The link layer 14 provides communication between physical network addresses—for instance, MAC ("Medium Access Control") addresses—of adjacent nodes in same individual network the internet 8 e.g. via network switches and/or hubs etc. which operate at the link layer 14.

In this example, the channel 12a is an application-layer channel at the application layer 17 of the network 8, established between the media relay server 10 and the instance of the communications client running on the user device 6a. That is, a process-to-process channel between the server 10 and the client. The application-layer channel 12a may, in turn, be established via one or more transport layer channels between the server 10 and the user device 6a, often referred to as end-to-end or host-to-host channel(s). Each transport layer channel is, in turn, is established via network layer channel(s) between one of user devices 6, 10 and a router 3, or between pairs of routers 3, which in turn are established via link layer channels within the individual networks of the internet 8.

The encoded audio stream 5a generated for the first user 2a is transmitted to the first user device 4a via the channel 12a. The channel 12a has an available bandwidth, which constitutes a maximum throughput of the channel 12a that is available for audio. That is, the available bandwidth constitutes an upper limit at which it is possible for encoded audio data to be transmitted via the channel 12a, which is determined by the total bandwidth of the channel and the extent to which the same channel is used to transmit other data. Note, the terms "channel bandwidth" and "maximum channel throughput" (or similar) are used interchangeably herein. The available bandwidth can for example be expresses in kbps (kilobits per second) or equivalently in Hz, MHz, GHz etc., that equivalence being well established in the art. In order to be able to transmit the encoded stream 5a via the channel 12a, i.e. in order to be able to stream mixed, encoded audio data to the user device 5a via the channel 12a, the bitrate of the encoded audio stream 5a should not exceed this available bandwidth, or at least should only exceed it transiently for reasons discussed above.

As described in detail below, the available bandwidth of the channel 12a is estimated for use in configuring the operation of an audio encoder (28, FIG. 3) executed on the media relay server 10. The encoded audio stream 7a is generated by the encoder 28 and transmitted to the first user device 4a via the channel 12a.

In the context of the present disclosure, the "available bandwidth" of a channel via which an encoded audio stream is transmitted means the bandwidth that is available for the encoded audio stream. Depending on the context, this may be the total bandwidth of the channel, or it may be only a portion of the total bandwidth, for example where only a portion of the total bandwidth is available for the encoded audio stream because it must share the channel with other data that requires its own portion of the total bandwidth.

In the specific examples described below, the available bandwidth of the channel 12a refers the portion of the total bandwidth of the channel 12a that is available for the encoded audio stream 7a, which is (at least approximately) the total bandwidth of the channel 12a less the bandwidth that is required for the transmission of associated header data generated in packetizing the audio stream and any additional associated VoIP data transmitted via the same channel 12a (such as control data and/or any other type of VoIP data being transmitted via the same channel 12a). However, the term is not limited to the specific examples described below.

Whilst in the present examples the channel 12a is an application layer channel, the subject matter is not limited in this respect. In general, the channel 12a whose available bandwidth is estimated to this end may be any suitable channel that constitutes a complete communications path between the media relay server 10 and the user device 4a, such as an end-to-end channel at the internet layer 16 between the server 10 and the user device 6a, or any other such channel, which may be established over a network that may or may not have a layered architecture, or by any other means.

Figure 3:
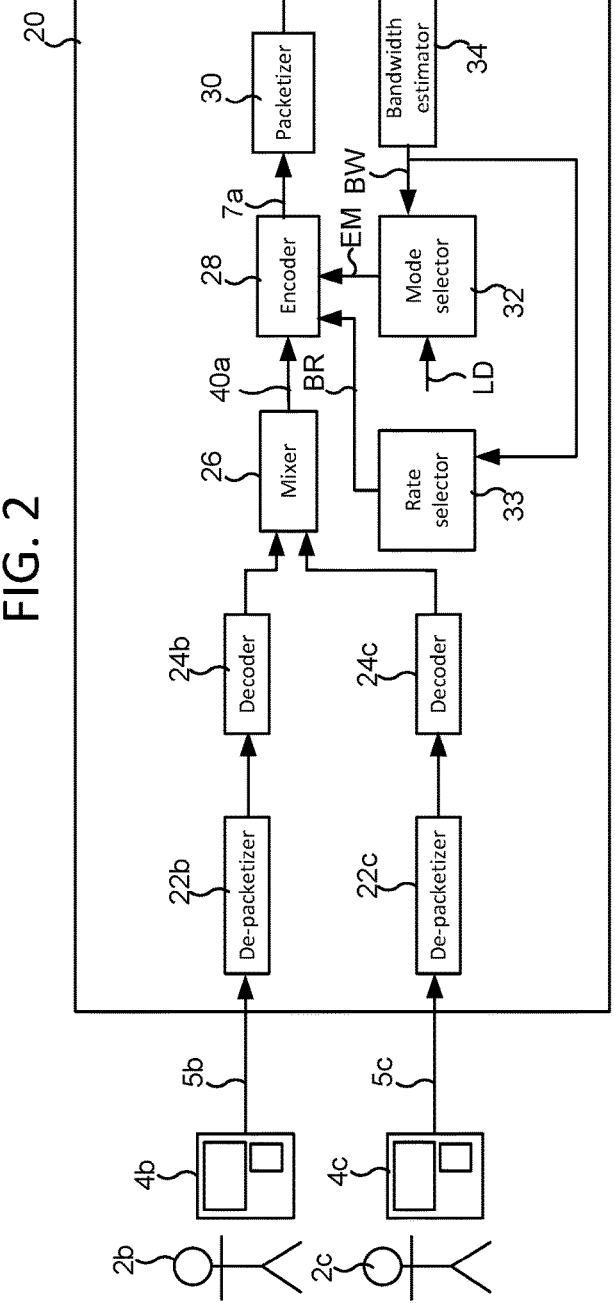
FIG. 3 shows functional modules of an encoding system implemented by a media server.

FIG. 3 shows a functional block diagram of an encoding system 20. The encoding system represents functionality implemented by executing stream management software on the processor 14 of the media server 10.

Herein below, a mechanism by which the first encoded, mixed audio stream 7a is generated from the second and third users' locally encoded audio streams 5b, 5c, and transmitted to the first user device 4a via the channel 12a.

Accordingly, only those modules of the encoding system 20 that are used to this end are shown.

However, it will be appreciated that the same mechanism can be used to generate the second encoded, mixed audio stream 7b from the locally encoded first and this streams 5a, 5c, and to generate the third encoded, mixed audio stream 7c from the streams 5a, 5b; and that the encoded, mixed streams 5b, 5c can be transmitted from the server 10 to the second and this user devices 4b, 4c via equivalent channels between the server 10 and those devices 4b, 4c.

The encoding system 20 is shown to comprise the following functional modules: de-packetizers 22b, 22c, each connected to receive a respective one of the second and third locally encoded audio streams 5b, 5c; audio decoders 24b, 24c, each having an input connected to an output of a respective one of the de-packetizers 22b, 22c; an audio mixer 26 having two inputs, each connected to an output of a respective on of the decoders 24b, 24c; the audio encoder 28 having an input connected to an output of the mixer 26; a packetizer 30 having an input connected to an output of the encoder 28; an encoding mode selector 32 having an output connected a second input of the encoder 28; a rate selector 33 having an output connected to a third input of the encoder 28; and a bandwidth estimator 34 having an output connected to an input of the mode selector 32 and to an input of the rate selector 33. Each of the functional modules 22b-34 represents a respective part of the functionality of the stream management code. The block diagram of FIG. 3 is representative only, and in the system 20 include additional modules such as a jitter-handling module, etc.

The audio encoder 28 is configured to generate the encoded audio stream 7a to be transmitted to the first user device 4a from an unencoded mixed audio stream 40a generated by the mixer 26 (see below). For example, the audio encoder 28 may encode the mixed audio stream 40a on a per frame bases, wherein each frame is formed of, say, 20 ms worth of audio data of the audio stream 40a.

The audio encoder 28 has at least two selectable encoding modes of different complexities—a high complexity (i.e. HC) mode and a low complexity (i.e. LC) mode of the kind described above. The mode selector 32 is configured to select one of these modes and configures the encoder 28 to operate in the selected encoding mode, which is denoted by the arrow labelled EM in FIG. 3. The mode selector 32 is configured to selectively switch the operation of the encoder 28 between the different modes, based on an estimate BW of the available bandwidth (i.e. that is available for audio) of the channel 12a generated by the bandwidth estimator 34 (see below). In configuring the encoder 28 to the LC mode, a portion of the available processing resources of the processor 14 is allocated to the encoder 28. In subsequently switching to the HC mode, the size of that allocation portion is increased, as the mode selector 32 is allowing the encoder 28 to perform more sophisticated but resource-intensive audio compression through the selection of the HC mode.

The encoder 28 may also have one or more additional intermediate complexity modes, having complexities somewhere in between those of the LC and HC modes. For the sake of simplicity, the following examples are described with reference to the HC and LC modes only, though as will be apparent in view of the following, the techniques can be extended to a greater number of encoding modes of different complexities.

The audio encoder operates at a current output bit rate that is selected by the rate selector 33. The currently selected output bitrate means the maximum rate at which the audio encoder 28 is currently configured to output bits of the encoded audio stream 7a. That is, the rate selector 33 configures the encoder to set the output rate of the encoder to a desired bit rate BR such that the encoded audio stream 7a generated by the audio encoder 28 has the desired bit rate BR. The desired bit rate BR for the encoded audio stream 7a is selected by the rate selector 33. The selection is based, in this example, on the bandwidth estimate BW generated by the bandwidth estimator 34, to ensure that BIRBW. That is, to ensure that the bit rate BR of the encoded audio stream 7a does not substantially exceed the throughput of the channel 12 that is available for encoded audio stream 7a; it if did then it would not be possible to stream the encoded audio data outputted by the encoder 28 via the channel 12a in full, as the encoder 28 would be outputting more data per interval of time that it is possible to transmit via the channel 12a in that interval of time. This could for example lead to accumulating delays in the transmission of packets of the audio stream 7a and/or result in packets of the audio stream having to be dropped persistently—both of which can result in a severe degradation in the perceived audio quality if allowed to continue for too long.

As noted above, in this example, some bandwidth needs to be reserved for header data (e.g. as generated by the packetizer 30), and any other components of the VoIP client that need bandwidth. The bandwidth estimator 34 takes all of this into account and allocates a portion of the total channel bandwidth to the audio encoder 28 that corresponds to the total bandwidth of the channel 12a less the reserved bandwidth. The bandwidth estimate BW of FIG. 3 corresponds to this allocated portion, i.e. it is an estimate of the portion of the total channel bandwidth that is available for the encoded audio stream 12a, and not an estimate of the total channel bandwidth per se in this example. The bandwidth estimate BW may for example be generated by the bandwidth estimator 34 estimating the total bandwidth of the channel 12a, and then reducing this total estimate by an amount that ensures a sufficient portion of the total bandwidth is reserved for the other data as needed.

The rate selector 33 may change the desired bitrate BR accordingly, in response to changes in the bandwidth estimate BW, to increase it when more bandwidth becomes available to make optimal use of the available channel bandwidth (up to a maximum bit rate that is independent of the available bandwidth in some cases), and decrease it when bandwidth becomes more limited to ensure that the rate RT does not substantially exceed the maximum throughput BW available for audio.

In other words, the encoder 28 encodes the audio stream 40a at an output bitrate that is adapted in response to changes in the available bandwidth of the channel, such that the output bit rate BR does not substantially exceed the available channel bandwidth. "Substantially" in this context means that the bitrate BR may, in some cases, intermittently exceed the available channel bandwidth for a short time (which can be account for temporarily, for example, by dropping one or more of the packets in which the audio stream 40a is encapsulated by the packetizer 30), provided that steps are taken to subsequently reduce it to or below the throughput BW that is available for audio.

In this example, this is achieved by the rate selector 33 using the bandwidth estimate BW generated by the bandwidth estimator 34 to set the output bitrate BR of the encoder 28. Alternatively, the output bitrate BR of the audio encoder may be adapted in dependence on the (physical) available bandwidth of the channel by some other means, in some cases without having to use a measure or estimate of the available channel bandwidth as such. For example, by monitoring buffering of the encoded audio data in a buffer(s) the media server 10 and/or by monitoring packet loss on the channel 12a, wherein the output bitrate BR is reduced if the buffer(s) becomes overloaded and/or if the packet loss is excessive in order to ensure that the output bitrate BR does not substantially exceed the available channel bandwidth, i.e. the bandwidth allocated for audio which as noted is the total channel bandwidths minus overhead and any bandwidth BW required by other modules.

An audio encoding method will now be described with reference to FIG. 4, which shows a flowchart for the method. The method is a computer-implemented method, implemented by the encoding system 20 of the media server 10.

At step S2, the locally encoded audio streams 5b/5c are received at the media relay server 10, and de-packetized and decoded by the de-packetizers 22b/22c and decoders 24b/24c respectively. At step S4, the decoded streams are mixed by mixer 26 so as to generate unencoded, mixed audio stream 40a for the first user 2a.

At step S6, the available bandwidth of the channel 12a between the media relay 10 is estimated, by the bandwidth estimator 34. The estimated bandwidth is denoted by the output labelled BW in FIG. 3. The estimated bandwidth is compared with at least a first bandwidth threshold T1 (S8) for the purpose of selecting an encoding mode of the encoder 28, and at step S10 the method branches depending on whether the estimated bandwidth BW is above or below the first bandwidth threshold T1 in order to select an appropriate encoding mode. The encoding mode is selected at step S12, S16 or S18, depending on conditions on the channel 12a and, in some cases, the load on the processor 14 as explained in further detail below. For as long as that mode remains selected, the encoder 28 operates in that selected mode to encode the mixed audio stream 40a (S20).

The mode selection can be switched to a new mode whilst the audio stream 40a is being encoded, such that thereafter the mixed audio stream 40a is encoded in the newly-selected mode.

The encoded audio stream 7a is packetized by packetizer 30, and transmitted to the first user device 4a via the communications channel 12a. For example, each packet generated by the packetizer 30 may contain one whole encoded audio frame generated by the encoder 28, such that each packet is formed of an encoder frame as its payload and associated header data.

Figure 4:
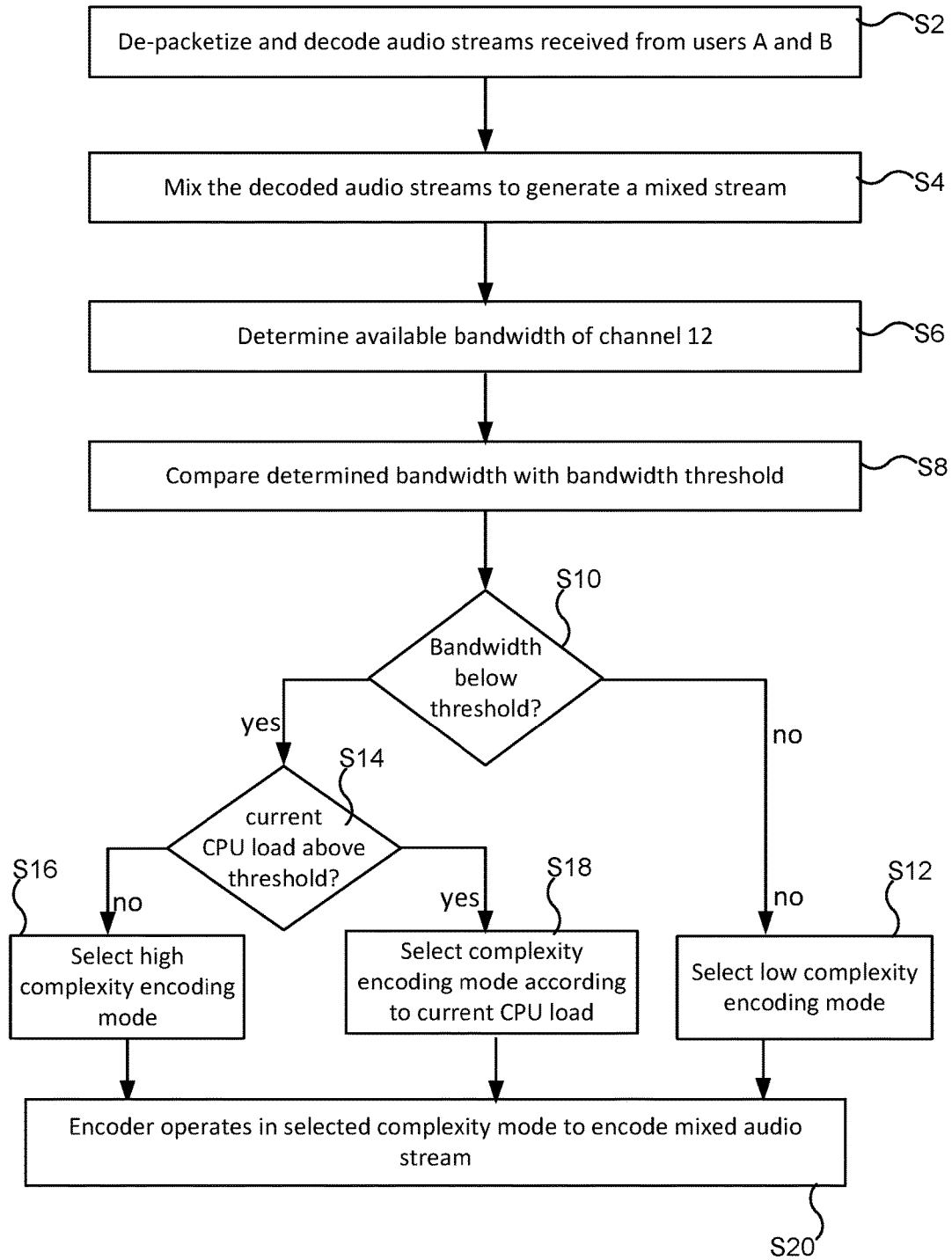
FIG. 4 shows a flowchart for a method of encoding an audio stream.

Although not shown explicitly in FIG. 4, the encoder 28 is configured initially to operate in in the LC mode by default, independently of the bandwidth estimation of step S6. That is, the portion of processing resources allocated to the encoder 28 has an initial size that is independent of the available bandwidth of the channel 12a, as defined by the LC mode.

The bandwidth estimator 34 runs in the background so as to periodically provide estimates of the available bandwidth of the channel 12a. For as long as the estimated bandwidth BW remains above the first bandwidth threshold T1, the LC mode remains selected (S12). If and when the estimated bandwidth falls below the first bandwidth threshold T1, in some circumstances, the encoder may be configured to its HC mode (S16) by the mode selector 32, thereby increasing the size of the portion of processing resources allocated to the encoder 28 to that defined by the HC mode. However, as described in further detail below, the method does not always proceed to step S16 if the estimated bandwidth is below T1 at step S10: in some cases the method also, at step S14, accounts for the current load on the processor 14 (e.g.

CPU load), i.e. a measure of the processing resources that are currently available, denoted LD in FIG. 3.

The portion of the available processing resources of the processor 14 that is allocated to the encoder 28 is greater at step S16, i.e. if the bandwidth estimate BW is above T1, than at step S12, i.e. if the bandwidth estimate BW is below T1, due to the selected complexity mode at step S16 being higher than that selected at step S12.

The first bandwidth threshold T1 may be chosen based on a desired trade-off between server scale and audio quality.

If the bandwidth estimate subsequent increases, one option is for the mode selector 32 to switch the mode of encoder 28 back to the LC mode if and when the estimated bandwidth BW reaches the first bandwidth threshold T1. However, this can result in frequent switching between the LC and HC modes if the estimated bandwidth BW is fluctuating around the first threshold T1. To prevent such frequent switches between complexity modes, the mode selector 32 may switch from LC to HC mode if and when the bandwidth estimate falls below T1 but only switch back to LC mode to HC mode if and when the bandwidth estimate subsequently increase to reach a second bandwidth threshold T2, which is different than and may be greater than T1.

Alternatively or additionally, the mode selector 32 may enforce a certain minimum time period before the encoder switches from one complexity mode to another; that is, such that mode switches occur at a rate no greater than a maximum mode switching rate which is independent of the available bandwidth of the channel 12a.

As the estimated bandwidth BW (i.e. the bandwidth allocated for audio) changes in this manner, the rate selector 33 will adapt the desired bit rate BR for the encoded audio stream 7a in parallel, in the manner described above. Thus as the bandwidth increases above T2, the output bit rate BR will be increased by the rate selector 33 accordingly, which in turn means that the encoder 28 is able to minimize perceptual distortion of the encoded audio stream 7a using fewer processing resources. Conversely, as the bandwidth falls below T1, the output bit rate BR will be reduced by the rate selector 33 to ensure that streaming of the output of the encoder 28 via the channel 12a in full is still possible, in which case more processing resources are needed by the encoder 28 to maintain an acceptable perceptual quality of the encoded audio stream 7a.

As noted above, in addition to configuring the complexity mode based on the available bandwidth, it can be beneficial to also take into account server CPU load. For instance, if a number of conferences involving several low bandwidth clients are hosted on a single server, there may be an excessive demand for encoders in the HC mode. To avoid this, a measure of processor load (e.g. CPU load) of the processor 14, denoted LC in FIG. 3, may be used in addition to the bandwidth estimate BW. The load measure relates to the amount of processing resources that are available, with a higher load denoting fewer available resources.

Returning to FIG. 4, if at step S10 it is determined that the available bandwidth is below the first bandwidth threshold T1, the method branches (S14) depending on whether or not the measure of processor load LD current exceeds a load threshold (meaning that the amount of available resources of the processor 14 is below a corresponding availability threshold). If not, the method proceeds to step S16 as described above, at which the HC encoding mode is selected for the encoder 28. However, if the processor load is above the load threshold, the method proceeds to S18 at which one of the encoding modes is selected taking into account the high current processor load.

For example, encoders for new participants joining calls after the load LC has reached the load threshold may be restricted to LC mode only, such that at step S18 the LC mode is selected in the case that the first user 4a is a new participant, even though his available bandwidth is below T1.

Alternatively, a global optimization may be performed to adjust the complexity mode of all active encoders based on an ordered list of available bandwidth to each encoder. That is, the N lowest-bandwidth participants may be prioritized, by allocating more of the available processing resources to their encoders (N≥1). Alternatively or in addition, the allocation of processing resources may be performed according to one or more quality of service (QoS), so as to bias the allocation of processing resources towards encoders that have higher QoS levels. For example, where two encoders have substantially the same bandwidths available to them for audio but different QoS levels, a greater portion of the available processing resources may be allocated to the encoder having the higher QoS level.

In yet another alternative when the processor load is excessive, for video calls, the HC mode may be always selected at S18 to preserve audio quality, with one or more processing resource allocations to one or more other software modules executed on the same processor 14 being reduced to free-up processing resources to allow HC mode audio encoding.

As indicated above, the present techniques can also be implemented at the clients executed on the user devices 4a, 4b, 4c. In this case, the HC mode may be always selected at S18 to preserve audio quality, wherein a processing resource allocation to a video encoder(s) executed on the same processor 14 is reduced to free-up processing resources to allow HC mode audio encoding. That is, video quality may be sacrificed in favour of audio quality in that event. The same technique can be used at a media server executing one or more video encoders, e.g. to perform transcoding.

Figure 5:
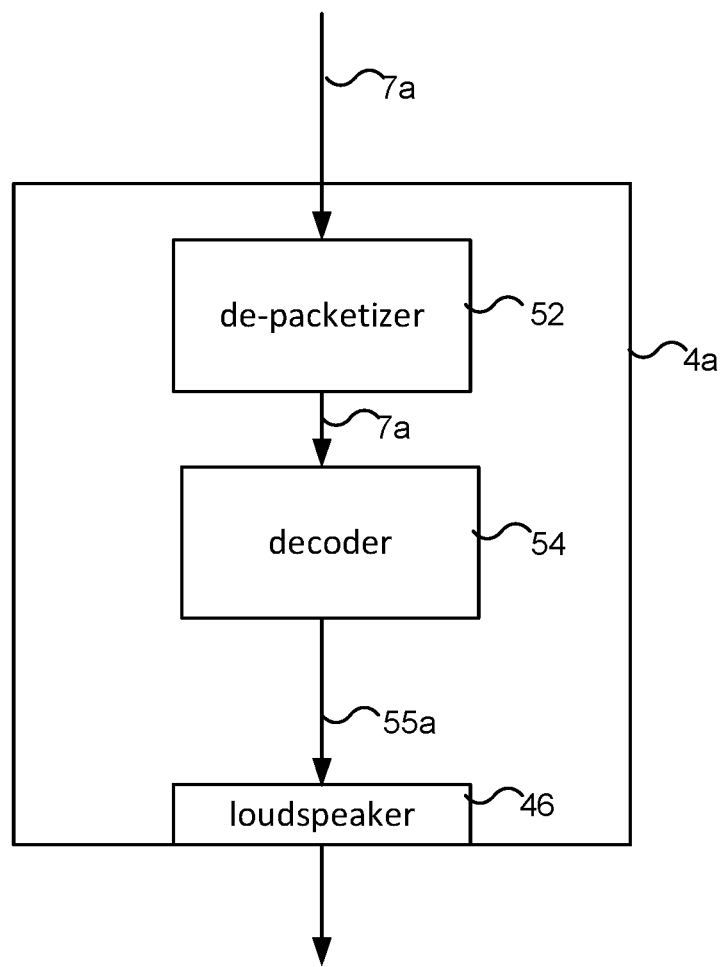
FIG. 5 shows a schematic block diagram of a user device.

As shown in FIG. 5, the first user device 4a receives the encoded and packetized mixed audio stream 7a. The client executed on the processor 6a of the first user device 4a implements a de-packetizer 52 and decoder 45. The de-packetizer 52 received the packetized mixed audio stream 7a and de-packetized it, and the decoder applies a decoding algorithm to the de-packetized stream 7a to generate a decoded audio stream 55a for outputting via loudspeaker apparatus 46 of the first user device to the first user 2a. The audio data of the decoded audio stream 55a is not identical to the original unencoded, mixed audio stream 40a generated at the media server 10 as the compression applied by the server-side encoder 28 is lossy. However, in applying the technique of FIG. 4, it is ensured that any perceptual distortion caused by differences between the audio of the original audio data 40a and that of the decoded stream 55a (i.e. as perceived by the first user 2a) is minimized whilst still making the most efficient use of the processing resources available at the media server 10.

Any encoder mode switching at the server 10 is invisible to the client on the first user device 4a, in the sense that the decoder 52 does not need to know which of the encoding modes has been used in order to be able to decode the encoded audio stream 7a. Thus the selected mode does not need to be signalled to the client by the server 10. For example, the Silk and Opus audio codes allow decoding without knowledge of the complexity mode used for encoding. Nevertheless, the possibility of using alternative, multi-mode encoders which do signal the selected mode is not excluded.

As noted, the above method considered only two encoding modes for simplicity. But as will be readily apparent the techniques can be extended to support additional intermediate encoding mode(s), with additional thresholds determining when switches between the various encoding modes occur.

Although not shown explicitly in FIG. 3, as mentioned, the encoding system may also comprise one or more video encoders that are executed on the same processor 14. For example, a video encoder executed on the processor 14 may receive a locally encoded video stream from one of the user devices 4a, 4b or 4c, and re-encode e.g. to reduce its bitrate for transmission to another of the user devices (e.g. a mobile device having limited bandwidth for video) and/or for compatibility with one of the other user devices—referred to as transcoding. By freeing-up processing resources by optimising the allocation of processing resources to the audio encoder(s) by the method of FIG. 4, more processing resources can be rendered available for allocation to the video encoder(s) to attain an improvement in video quality without any significant sacrifice in perceptual audio quality.

As noted, the term "complexity" as used above means "algorithmic complexity". That is the "complexity" of a code module, such as an audio encoder, implementing an algorithm refers to a temporal algorithmic complexity of the algorithm. As is known in the art, the temporal complexity of an algorithm is an intrinsic property of that algorithm which determines a number of elementary operations required for that algorithm to process any given input, with more complex algorithms requiring more elementary processing operations per input than their less sophisticated counterparts. This is the reason that any improved perceptual quality gain from higher complexity audio encoding comes at a cost in terms of required processing resources as the more complex, higher-quality encoding algorithms require more processor resources (i.e. more processor clock cycles per second) if they are to be able to process audio data quickly enough to be able to maintain the desired output bitrate of the encoded audio stream.

To aid understanding of this, it is useful to consider the following example, noting up from that this example is extremely simplified and provided for illustration only: suppose an unprocessed audio frame comprises N samples, each of M-bits. A first extremely basic down-sampling algorithm might act to simply halve the number of samples by 'skipping' every second sample. A second, somewhat more sophisticated down-sampling algorithm on the other hand, may perform a low-pass filtering of the audio frame (using e.g. an approximateC sinc filter) to suitably reduce signal bandwidth before 'skipping' every second filtered sample. The second algorithm is more complex than the first as, broadly speaking the same number of elementary operations are required to perform the 'skipping' steps for each, but additional elementary operations are required to perform the additional filtering steps of the second. Thus the second would require more processor resources than the first to maintain real-time operation when processing a stream of audio data but would, in accordance with the Nyquist sampling theorem, generally be expected to result in a higher output quality than the first as is known in the art. Of course, as will be readily appreciated, this is an extremely simplified example and that, in reality, no modern CPUs are slow enough that LP filtering would ever be a realistic problem for them.

In the above, a portion of the available processing resources of a processor are allocated, by a resource allocator in the form of the mode selector 32, to an encoder executed on that processor by selecting from encoder modes of that encoder having different algorithmic complexities. However, the subject matter is not limited in this respect and processing resources can be allocated by other means. For example, a resource allocator may allocate an encoder a certain fraction or percentage of the available processing resources explicitly or allocate explicitly a certain value in e.g. Hz, MHz GHz (i.e. allocate explicitly a certain number of clock cycles per second), which it changes dynamically as the determined channel bandwidth changed, and the encoder may be configured to dynamically adapt it operation such that it does not use substantially more that its allocated portion. For example, such allocations may be effected by way of hardware virtualization, i.e. whereby different pieces of hardware are emulated in software on the same processor and allocated resources of that processor, e.g. on a cloud computing platform.

In general the term "available processing resources of a processor" or similar refers to a set of clock cycles of the processor per unit of time (e.g. which may be expressed in Hz, MHz, GHz etc.) that are available for allocation to one or more audio encoders executed on the processor, and the term "a portion of the available processing resources allocated to an encoder executed on the processor" refers to a certain fraction of those clock cycles per unit of time that is reserved for and rendered available for use by that audio encoder by any suitable allocation means. References to a first portion of the available processing resources being "greater" (resp. "less than") a second portion of the available processing resources, or similar, means that the first portion constitutes a greater (resp. lesser) number of clock cycles per unit of time than the second portion.

Whilst the term "available processing resources of a processor" may in some cases refer to the total available processing resources of a processor, i.e. all or substantially all of that processor's clock cycles per unit of time, the term is not limited to this and can mean only a part of the total processing resources. For example, in a cloud computing context, multiple virtual servers (that is server hardware emulations) may run on the same physical processor, each of those virtual servers being allocated a portion of the physical processor's total processing resources. For example, the virtual server may be implemented on a cloud computing platform. In this context, the term "available processing resources" may for example refer to only the portion of the total resources allocated to one of the virtual servers, and which is thus available to that server to be, say, allocated to and reallocated between different encoders running on that same virtual server.

The server architecture shown in FIG. 1 and described above is exemplary. In general a server may comprise multiple processors, in a single server device or distributed between multiple server devices (that is, a server may be formed of multiple, cooperating server devices or more generally any suitable arrangement of server hardware). For example, the functional modules of the encoding system 20 may be executed on different processors, e.g. the mode selector 32 and bandwidth estimator 34 need not be executed on the same processor as the encoder 28, such that the mode selector 32 and bandwidth estimator 34 are not sharing the same set of processing resources as the encoder 28 (though in this case, the encoder 28 may still be sharing processing resources with other encoders executed on the same processor 14). Moreover, the term "server" also encompasses a virtual server e.g. of the kind described in the preceding paragraph that is running as an emulation on a physical processor, as well as physical servers formed of one or more physical server devices.

Moreover, whilst the above embodiments are implemented at the media server 10, the present techniques are not limited to server implementations. For example, the techniques may be implemented on one of the user devices 4a, 4b, 4c or on any other suitable computer system comprising one or more computer devices.

According to a first aspect of the present subject matter, a method of encoding an audio stream comprising the following steps: receiving, at an audio encoder executed on a processor, an audio stream to be transmitted to a receiving device via a communications channel, the processor having an amount of available processing resources; determining an available bandwidth of the communications channel; allocating to the audio encoder based on the determined bandwidth a portion of the available processing resources, wherein the allocated portion is greater if the determined bandwidth is below a bandwidth threshold; encoding, by the audio encoder, the audio stream using the allocated portion of processing resources; and transmitting the encoded audio stream to the receiving device via the communications channel.

In embodiments, the allocating step may be performed by selecting based on the determined bandwidth one of a plurality of encoding modes of the audio encoder having different complexities and configuring the encoder to operate in the selected encoding mode to encode the audio stream, wherein a higher complexity one of the encoding modes requiring the greater portion of the available processing resources is selected if the determined bandwidth is below the bandwidth threshold.

In response to an increase in the determined bandwidth occurring after said allocation, the allocated portion of the processing resources may be reduced.

The portion of the available processing resources allocated to the audio encoder may be reduced by switching, in response to the increase in the determined bandwidth, the audio encoder to a lower complexity one of the encoding modes requiring only the reduced portion of the available processing resources.

If the determined bandwidth subsequently increases from a value below the bandwidth threshold, the portion of the processing resources allocated to the audio encoder may be reduced only when the increasing bandwidth reaches a different bandwidth threshold. The different bandwidth threshold may be higher than the bandwidth threshold.

At least some of the available processing resources rendered available by said reduction in the allocated portion may be reallocated to another software module executed on the processor (e.g. a video encoder for use in encoding a video stream).

For example, the audio encoder may be part of a communication client executed on the processor and at least some of the available processing resources rendered available by said reduction in the allocated portion are reallocated to another software module of the communication client executed on the processor (e.g. a video encoder of the communication client).

The portion of the processing resources allocated to the audio encoder may be changed at a rate no greater than a maximum allocation change rate that is independent of the available bandwidth.

The portion of the available processing resources is initially allocated to the audio encoder independently of the available bandwidth when the audio stream is initially received at the audio encoder, and then increased in response to a subsequent determination that the available bandwidth is below the bandwidth threshold.

The method may further comprise: determining a measure of the amount of available processing resources; wherein the portion of the available processing resources is allocated based on the determined bandwidth of the communications channel and the determined measure of the amount of available processing resources.

The portion of the available processing resources allocated to the audio encoder may be greater if the determined bandwidth is below the bandwidth threshold and the amount of available processing resources is above an availability threshold than if the determined bandwidth is below the bandwidth threshold and the available processing resources is below the availability threshold.

Multiple audio encoders may be executed on the processor, wherein the steps are performed for each of the audio encoders to allocate to each of the audio encoders a respective portion of the available processing resources which that audio encoder uses to encode a respective audio stream for transmission to a respective receiving device via a respective communications channel.

The method may further comprise identifying subset of the audio encoders whose respective communications channels have the lowest available bandwidths (i.e. the N audio encoders having the N lowest available bandwidths, where N≥1), wherein a greater portion of the available processing resources is allocated to each of the identified audio encoders (i.e. each of the N audio encoders) that is allocated to any of the other audio encoders.

The subset may be identified in response to the available processing resources decreasing to an availability threshold.

Alternatively to in addition, the respective portion of the available processing resources may be allocated to each audio encoder based on the determined bandwidth and a quality of service level assigned to that encoder. For example, such that a greater portion of the available processing resources is allocated to one of the audio encoders having a higher assigned quality of service level and whose respective available bandwidth substantially matches that of another of the audio encoders having a lower assigned quality of service level.

The encoder may encode the audio stream at an output bitrate that is adapted in response to changes in the available bandwidth of the channel.

The determined bandwidth may be used to adapt the output bitrate.

In response to an increase (resp. decrease) in the available bandwidth, the output bitrate may be increased (resp. decreased) and the portion of the available processing resources allocated to the audio encoder may be decreased (resp. increased).

According to a second aspect of the present subject matter, a computer system comprises: a network interface for communicating with a receiving device via a communications channel; a bandwidth determiner configured to determine an available bandwidth of the communications channel; an audio encoder executed on a processor of the computer system and configured to receive an audio stream to be transmitted to the receiving device via the communications channel, the processor having an amount of available processing resources; and a resource allocator configured to allocate to the audio encoder based on the determined bandwidth a portion of the available processing resources, wherein the allocated portion is greater if the determined bandwidth is below a bandwidth threshold, wherein the audio encoder is configured to encode the audio stream using the allocated portion of processing resources, and wherein the network interface is configured to transmit the encoded audio stream to the receiving device via the communications channel.

In embodiments, the computer system may be configured to operate as a server.

Alternatively the computer system may be embodied in a user device.

The computer system may, in embodiments, be configured to implement any of the features of the above-described embodiments of the first aspect.

According to a third aspect of the present subject matter, a computer program product comprises resource allocation code stored on a computer readable storage medium, wherein the resource allocation code is configured when executed to allocate available processing resources of a processor to an audio encoder executed on the processor by implementing any of the method steps or system functionality disclosed herein.

Generally, many of the functions described herein can be implemented using software, firmware, hardware (e.g., fixed logic circuitry), or a combination of these implementations. The terms "module," "functionality," "component" and "logic" as used herein, such as those of FIG. 3 (other than the encoder 28 itself), can be implemented in software, firmware, hardware, or any combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors. For example, the user devices 6a-6c or the server 10 may also include an entity (e.g. software) that causes hardware of the user devices to perform operations, e.g., processors functional blocks, and so on. For example, the user devices may include a computer-readable medium that may be configured to maintain instructions that cause the user devices, and more particularly the operating system and associated hardware of the user devices to perform operations. Thus, the instructions function to configure the operating system and associated hardware to perform the operations and in this way result in transformation of the operating system and associated hardware to perform functions. The instructions may be provided by the computer-readable medium to the user devices through a variety of different configurations. One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of encoding an audio stream comprising:
receiving, at an audio encoder executed on a processor, an audio stream to be transmitted to a receiving device via a communications channel, the processor having an amount of available processing resources;
determining an available bandwidth of the communications channel;
comparing the determined bandwidth to a bandwidth threshold;
determining a measure of processor load that corresponds to the amount of available processing resources;
allocating a portion of the available processing resources to the audio encoder based on the determined bandwidth of the communications channel and the determined processor load,
wherein the allocated portion of the available processing resources is greater if the determined bandwidth is below the bandwidth threshold than if the determined bandwidth is above the bandwidth threshold, and
wherein the portion of the available processing resources allocated to the audio encoder is greater if the determined bandwidth is below the bandwidth threshold and the processor load is below a processor load threshold than if the determined bandwidth is below the bandwidth threshold and the processor load is above the processor load threshold;
encoding, by the audio encoder, the audio stream using the allocated portion of processing resources; and
transmitting the encoded audio stream for receipt by the receiving device via the communications channel;
wherein multiple audio encoders are executed on the processor, wherein each of the audio encoders is allocated a respective portion of the available processing resources which that audio encoder uses to encode a respective audio stream for transmission for receipt by a respective receiving device via a respective communications channel; and
wherein the allocating includes, in response to the processor load increasing to the processor load threshold, identifying a subset of the audio encoders whose respective communications channels have the lowest available bandwidths, wherein a greater portion of the available processing resources is allocated to each of the identified audio encoders than is allocated to any of the other audio encoders.

2. A method according to claim 1, wherein the allocating step is performed by selecting based on the determined bandwidth one of a plurality of encoding modes of the audio encoder having different complexities, and configuring the encoder to operate in the selected encoding mode to encode the audio stream;
wherein a higher complexity one of the encoding modes requiring the greater portion of the available processing resources is selected if the determined bandwidth is below the bandwidth threshold and the processor load is below the processor load threshold.

3. A method according to claim 1, wherein in response to an increase in the determined bandwidth occurring after said allocation, the allocated portion of the processing resources is reduced.

4. A method according to claim 2, wherein:
in response to an increase in the determined bandwidth occurring after said allocation, the allocated portion of the processing resources is reduced; and the portion of the available processing resources allocated to the audio encoder is reduced by switching, in response to the increase in the determined bandwidth, the audio encoder to a lower complexity one of the encoding modes requiring only the reduced portion of the available processing resources.

5. A method according to claim 3, wherein if the determined bandwidth subsequently increases from a value below the bandwidth threshold, the portion of the processing resources allocated to the audio encoder is reduced when the increasing bandwidth reaches a different bandwidth threshold.

6. A method according to claim 5, wherein the different bandwidth threshold is higher than the bandwidth threshold.

7. A method according to claim 3, wherein the audio encoder is part of a communication client executed on the processor and at least some of the available processing resources rendered available by said reduction in the allocated portion are reallocated to another software module of the communications client executed on the processor.

8. A method according to claim 1, wherein the portion of the processing resources allocated to the audio encoder is changed at a rate no greater than a maximum allocation change rate that is independent of the available bandwidth.

9. A method according to claim 1, wherein the portion of the available processing resources is initially allocated to the audio encoder independently of the available bandwidth when the audio stream is initially received at the audio encoder, and then increased in response to a subsequent determination that the available bandwidth is below the bandwidth threshold.

10. A method according to claim 1, further comprising:
encoding the audio stream at an output bitrate that is adapted in response to changes in the available bandwidth of the communications channel.

11. A method according to claim 10, wherein the changed bandwidth is used to adapt the output bitrate.

12. A method according to claim 10, wherein in response to an increase in the available bandwidth, the output bitrate is increased and the portion of the available processing resources allocated to the audio encoder is reduced.

13. A method according to claim 1, wherein the audio encoders implement a plurality of encoding modes comprising a higher complexity encoding mode that requires a greater portion of the available processing resources and a lower complexity encoding mode that requires a lesser portion of the available processing resources, further comprising:
for one or more initial audio streams being encoded:
determining that the determined bandwidth is below the bandwidth threshold and the processor load is below the processor load threshold; and
encoding the one or more initial audio streams using the high complexity encoding mode; and
for a subsequent audio stream being encoded:
determining that the determined bandwidth is below the bandwidth threshold and the processor load is above the processor load threshold; and
encoding the subsequent audio stream using the low complexity encoding mode.

14. A method according to claim 13, wherein the one or more initial audio streams and the subsequent audio stream are part of a same conference call.

15. A computer system comprising:
a network interface for communicating with a receiving device via a communications channel;
a bandwidth determiner configured to:
determine an available bandwidth of the communications channel; and
determining a measure of processor load that corresponds to an amount of available processing resources;
an audio encoder executed on a processor of the computer system and configured to receive an audio stream to be transmitted to the receiving device via the communications channel, the processor having the amount of available processing resources; and
a resource allocator configured to compare the determined bandwidth to a bandwidth threshold, and to allocate, to the audio encoder based on the determined bandwidth of the communications channel and the determined processor load, a portion of the available processing resources, wherein the allocated portion of the available processing resources is greater if the determined bandwidth is below the bandwidth threshold than if the determined bandwidth is above the bandwidth threshold, wherein the portion of the available processing resources allocated to the audio encoder is greater if the determined bandwidth is below the bandwidth threshold and the processor load is below a processor load threshold than if the determined bandwidth is below the bandwidth threshold and the processor load is above the processor load threshold, wherein the audio encoder is configured to encode the audio stream using the allocated portion of processing resources, and wherein the network interface is configured to transmit the encoded audio stream for receipt by the receiving device via the communications channel;
wherein multiple audio encoders are executed on the processor, wherein each of the audio encoders is allocated a respective portion of the available processing resources which that audio encoder uses to encode a respective audio stream for transmission for receipt by a respective receiving device via a respective communications channel; and
wherein the resource allocator is further configured to, in response to the processor load increasing to the processor load threshold, identifying a subset of the audio encoders whose respective communications channels have the lowest available bandwidths, wherein a greater portion of the available processing resources is allocated to each of the identified audio encoders than is allocated to any of the other audio encoders.

16. A computer system according to claim 15, wherein the computing system comprises one or more of a server or a user device.

17. A computer readable storage device storing instructions that are executable by a processing system to perform operations including:
determining an available bandwidth of a communications channel via which an audio stream is to be transmitted to a receiving device;
comparing the determined bandwidth to a bandwidth threshold;
determining a measure of processor load that corresponds to an amount of available processing resources; and
allocating a portion of the available processing resources to an audio encoder based on the determined bandwidth of the communications channel and the determined processor load, thereby causing the audio encoder to encode the audio stream using the allocated portion of the processing resources for transmission to the receiving device via the communications channel, wherein the allocated portion is greater if the determined bandwidth is below the bandwidth threshold than if the determined bandwidth is above the bandwidth threshold, and wherein the portion of the available processing resources allocated to the audio encoder is greater if the determined bandwidth is below the bandwidth threshold and the processor load is below a processor load threshold than if the determined bandwidth is below the bandwidth threshold and the processor load is above the processor load threshold;

wherein multiple audio encoders are executed on the processor, wherein each of the audio encoders is allocated a respective portion of the available processing resources which that audio encoder uses to encode a respective audio stream for transmission for receipt by a respective receiving device via a respective communications channel; and wherein the allocating includes, in response to the processor load increasing to the processor load threshold, identifying a subset of the audio encoders whose respective communications channels have the lowest available bandwidths, wherein a greater portion of the available processing resources is allocated to each of the identified audio encoders than is allocated to any of the other audio encoders.

* * * * *